(12) United States Patent
Storey et al.

(10) Patent No.: US 7,013,926 B1
(45) Date of Patent: Mar. 21, 2006

(54) PLUMBING LEAK TESTING APPARATUS

(76) Inventors: Randy Storey, 10189 W. Sample Rd., Coral Springs, FL (US) 33065; Michael Anthony, 10189 W. Sample Rd., Coral Springs, FL (US) 33065

( * ) Notice: Subject to any disclaimer, the term of this patent is extended or adjusted under 35 U.S.C. 154(b) by 0 days.

(21) Appl. No.: 10/994,808

(22) Filed: Nov. 22, 2004

(51) Int. Cl.
*F16L 55/12* (2006.01)
*F16K 7/07* (2006.01)

(52) U.S. Cl. .................. 138/93; 138/89; 138/90; 251/149.6; 137/454.2

(58) Field of Classification Search .................. 138/93, 138/89, 90; 137/24, 522, 454.2; 251/149.6; 134/24
See application file for complete search history.

(56) References Cited

U.S. PATENT DOCUMENTS

| | | | | |
|---|---|---|---|---|
| 3,946,759 A | * | 3/1976 | Mercier | 138/30 |
| 4,083,384 A | * | 4/1978 | Horne et al. | 138/93 |
| 4,354,515 A | * | 10/1982 | Sutherland | 134/167 C |
| 4,614,206 A | * | 9/1986 | Mathison et al. | 138/93 |
| 5,353,842 A | * | 10/1994 | Lundman | 138/93 |
| 5,901,752 A | * | 5/1999 | Lundman | 138/93 |
| 6,321,793 B1 | * | 11/2001 | Czaplicki et al. | 138/93 |
| 6,361,015 B1 | * | 3/2002 | Warmerdam | 251/5 |
| 6,899,138 B1 | * | 5/2005 | Lundman | 138/93 |
| 6,901,966 B1 | * | 6/2005 | Onuki et al. | 138/93 |

* cited by examiner

*Primary Examiner*—Patrick Brinson
(74) *Attorney, Agent, or Firm*—Mark D. Bowen, Esq.; Stearns Weaver Miller Weissler Alhadeff & Sitterson P.A.

(57) ABSTRACT

A plumbing pipe plug apparatus configured for insertion into a section of pipe and adapted to radially expand so as to engage the inner surface of the pipe and form a positive seal therewith is disclosed. The pipe plug is adapted with a conduit having a check valve that opens in response to fluid pressure to enable the injection into the plumbing system of a pressurized fluid, such as water, to pressurize the system downstream of the plug to allow for leak inspection and pressure testing.

5 Claims, 10 Drawing Sheets

PLUMBING LEAK TESTING APPARATUS

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates to a pipe leak testing apparatus, and more particularly to a plumbing pipe plug for testing plumbing systems for fluid integrity.

2. Description of Related Art

Plumbing and piping systems are typically constructed by connecting sections of pipe with fittings, valves, and other accessories. It is customary for plumbing systems to be pressure tested for leaks prior to entering service. Such tests require that the plumbing system, or a section thereof, be pressurized and inspected for leaks. In addition, it is often necessary to isolate a section of pipe for various reasons. For example, maintenance matters and safety considerations often require that a particular section of pipe connected to a system be isolated from the rest of the system while work is being performed.

Accordingly, there exists a need for an easy to install pipe test plug for isolation of piping systems during testing, repair and maintenance, for bypassing of damaged lines, and for isolation of piping systems during construction. More particularly, there exists a need for a pipe plug apparatus configured for insertion into a section of pipe and adapted to radially expand so as to engage the inner surface of the pipe and form a positive seal therewith. There further exists a need for such an apparatus wherein a pressurized fluid, such as water, may be injected into the pipe system to pressurize the system to allow for leak inspection and pressure testing.

BRIEF SUMMARY OF THE INVENTION

The present invention addresses the needs in the art by providing a plumbing pipe plug apparatus configured for insertion into a section of pipe and adapted to radially expand so as to engage the inner surface of the pipe and form a positive seal therewith. The plumbing pipe plug is further adapted to enable the injection into the plumbing system of a pressurized fluid, such as water, to pressurize the system downstream of the plug to allow for leak inspection and pressure testing.

Accordingly, it is an object of the present invention to provide a plumbing leak detection apparatus.

Another object of the present invention is to provide a plumbing pipe plug apparatus configured for insertion into a section of pipe and adapted for radial expansion to form a seal.

Still another object of the present invention is to provide a plumbing pipe plug apparatus adapted for pressurizing a section of pipe by forming a positive seal while providing a conduit for a pressurized fluid, such as water, to enter the pipe.

In accordance with these and other objects, which will become apparent hereinafter, the instant invention will now be described with particular reference to the accompanying drawings.

DETAILED DESCRIPTION OF THE INVENTION

Figure 1:
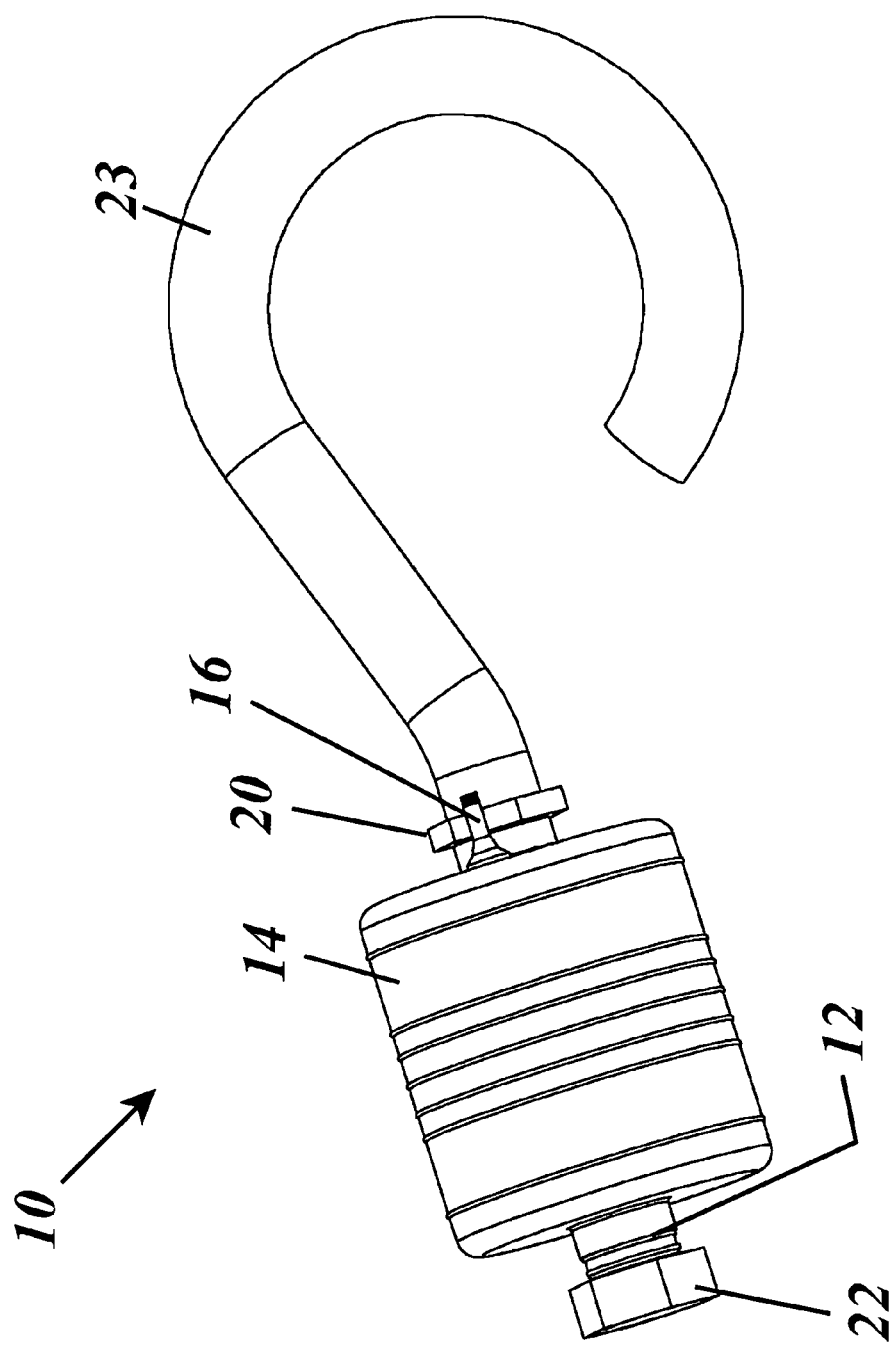
FIG. 1 depicts a side view of a plumbing pipe plug apparatus according to the present invention.
Figure 2:
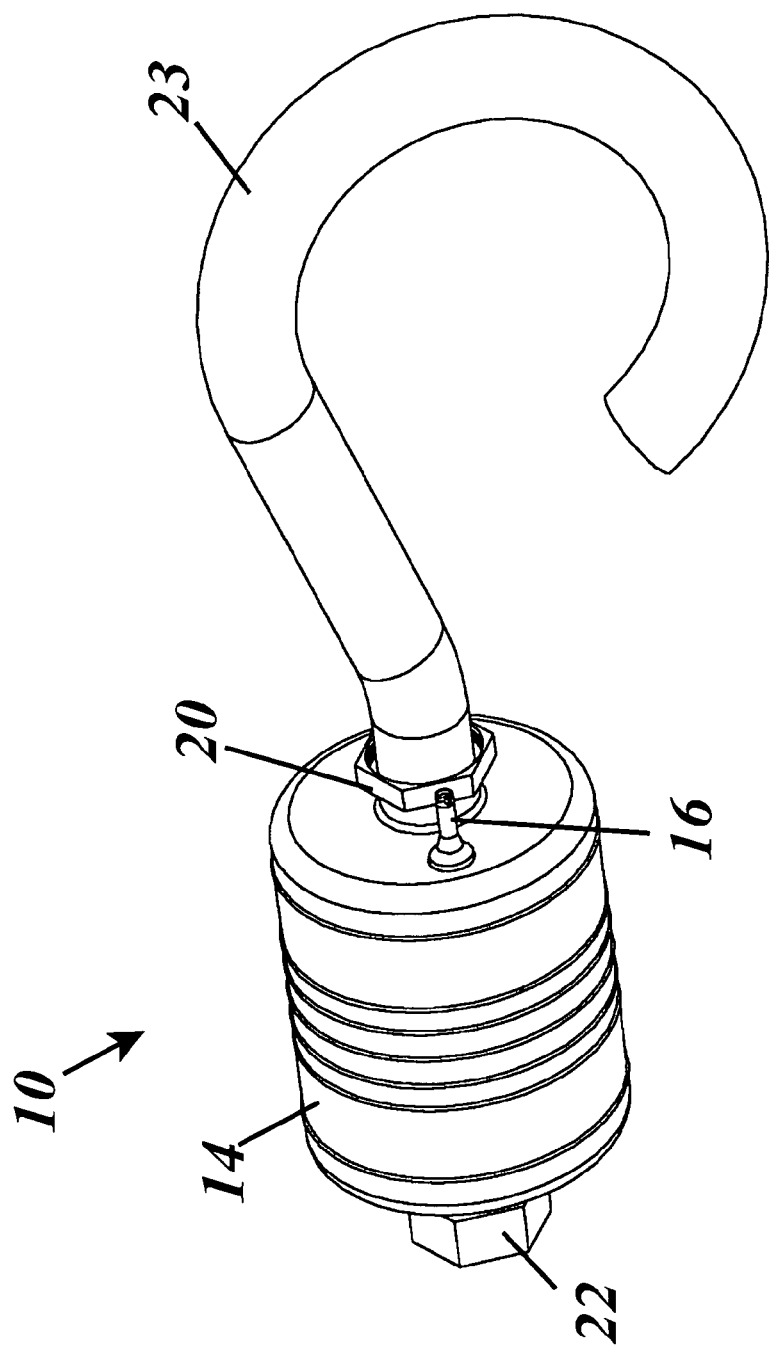
FIGS. 2 and 3 are perspective views thereof.
Figure 3:
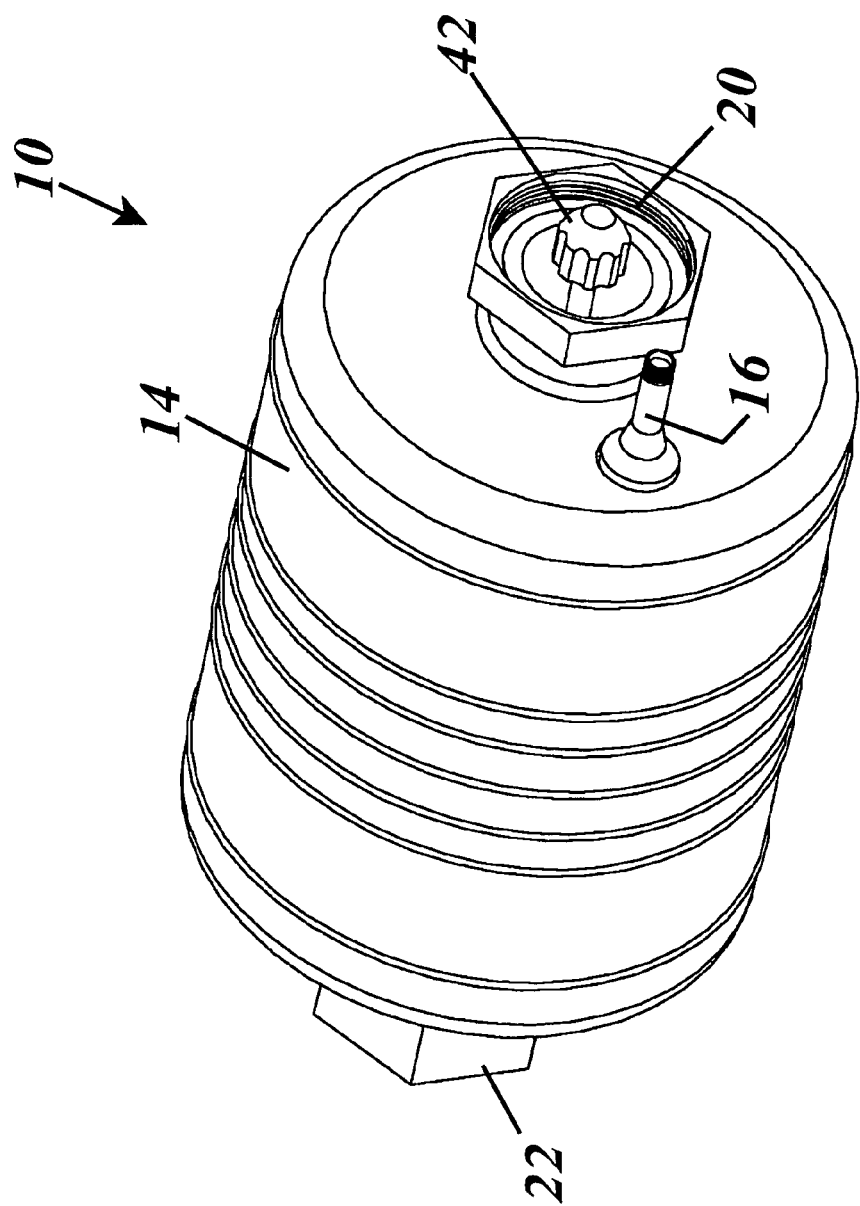
Figure 4:
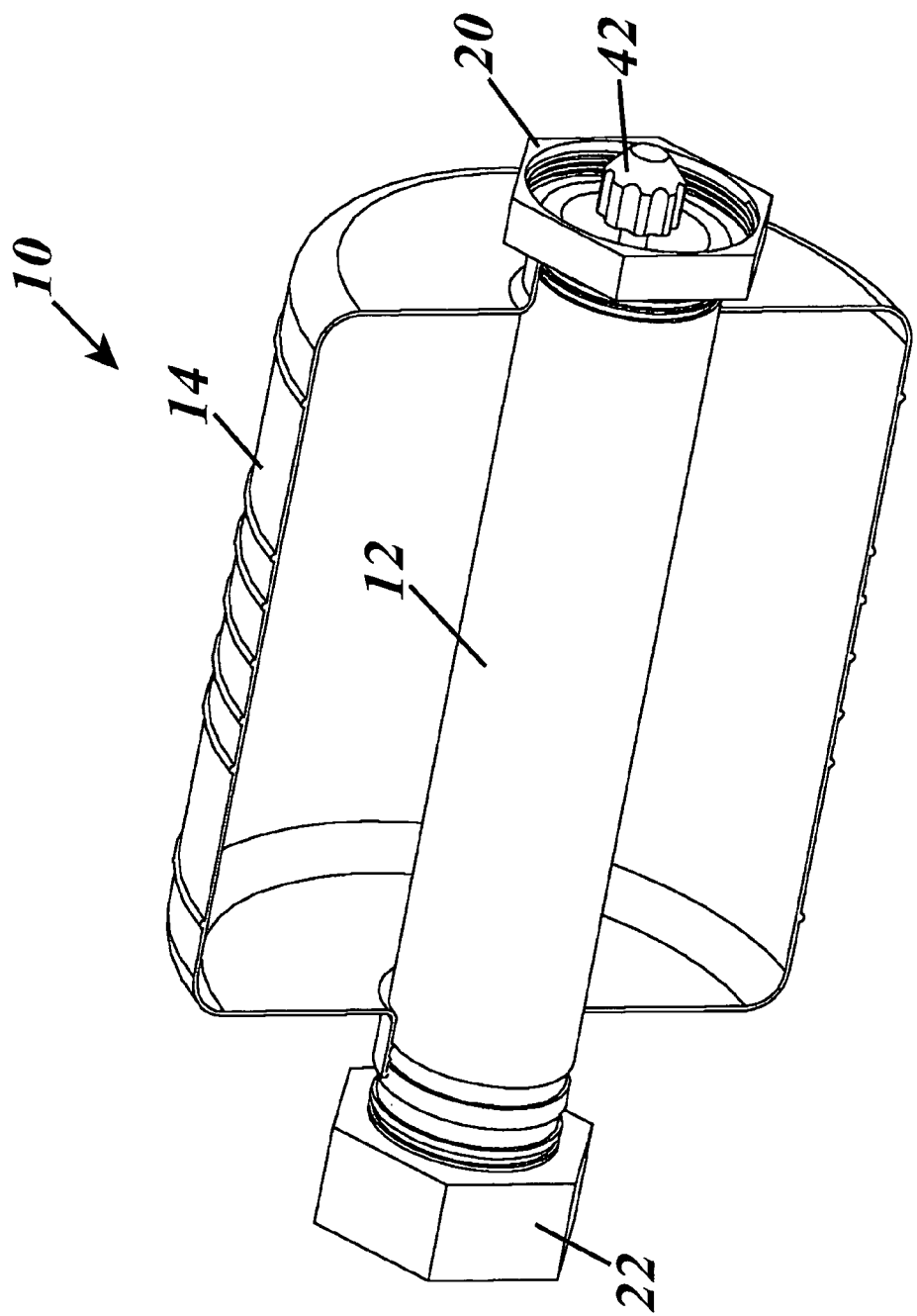
FIGS. 4–6 are perspective sectional views thereof.

With reference now to the drawings FIGS. 1–10 depict a plumbing pipe plug apparatus, generally referenced as 10, according to the present invention. Plumbing pipe plug apparatus 10 is generally cylindrically shaped for insertion within a section of pipe or tubing. Pipe plug 10 relies primarily on pneumatically actuated radial expansion to form a seal with the inner surface of a pipe or tube. More particularly, pipe plug 10 includes a cylindrical conduit 12 axially disposed within a generally cylindrical, pneumatically expandable body 14 configured for manual insertion in, and sealing engagement with a section of pipe. Referring to FIG. 1, pipe plug 10 has a pneumatically expandable body 14 in the form of a pneumatic expandable bladder that has a diameter and length suited to the general diameter of the pipe or tubing in which it is installed for operation. Expandable body 14 includes an inlet port 16, that preferably comprises a schrader valve to facilitate connection to a hose from a compressed air source for filling expandable body 14 with air so as to effect radial expansion thereof. Accordingly, inlet port 16 functions as a connection port for connection of a hose for filling expandable body 14 with a fluid, such as compressed air. The selective introduction of compressed air via inlet port 16 functions to cause radial expansion of body 14 until the peripheral edge of body 14 engages the inner wall of the conduit and forms a positive seal.

Figure 5:
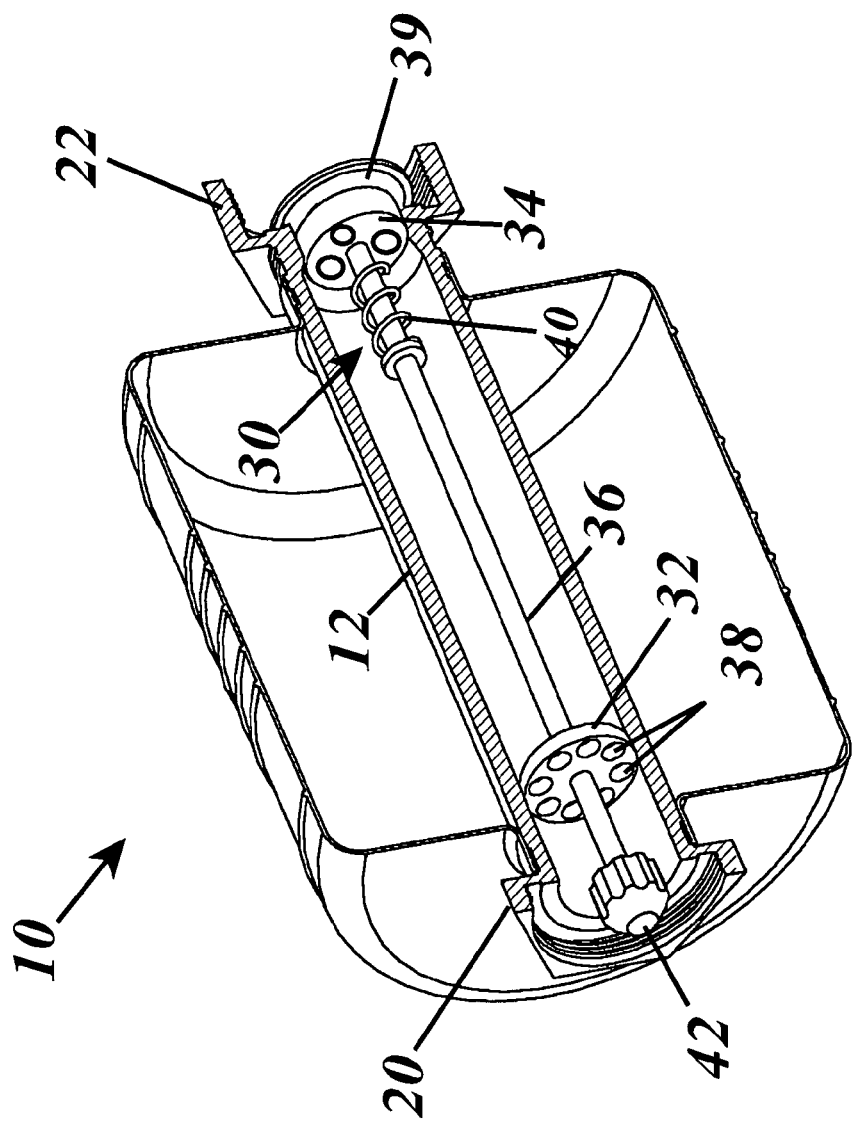
Figure 6:
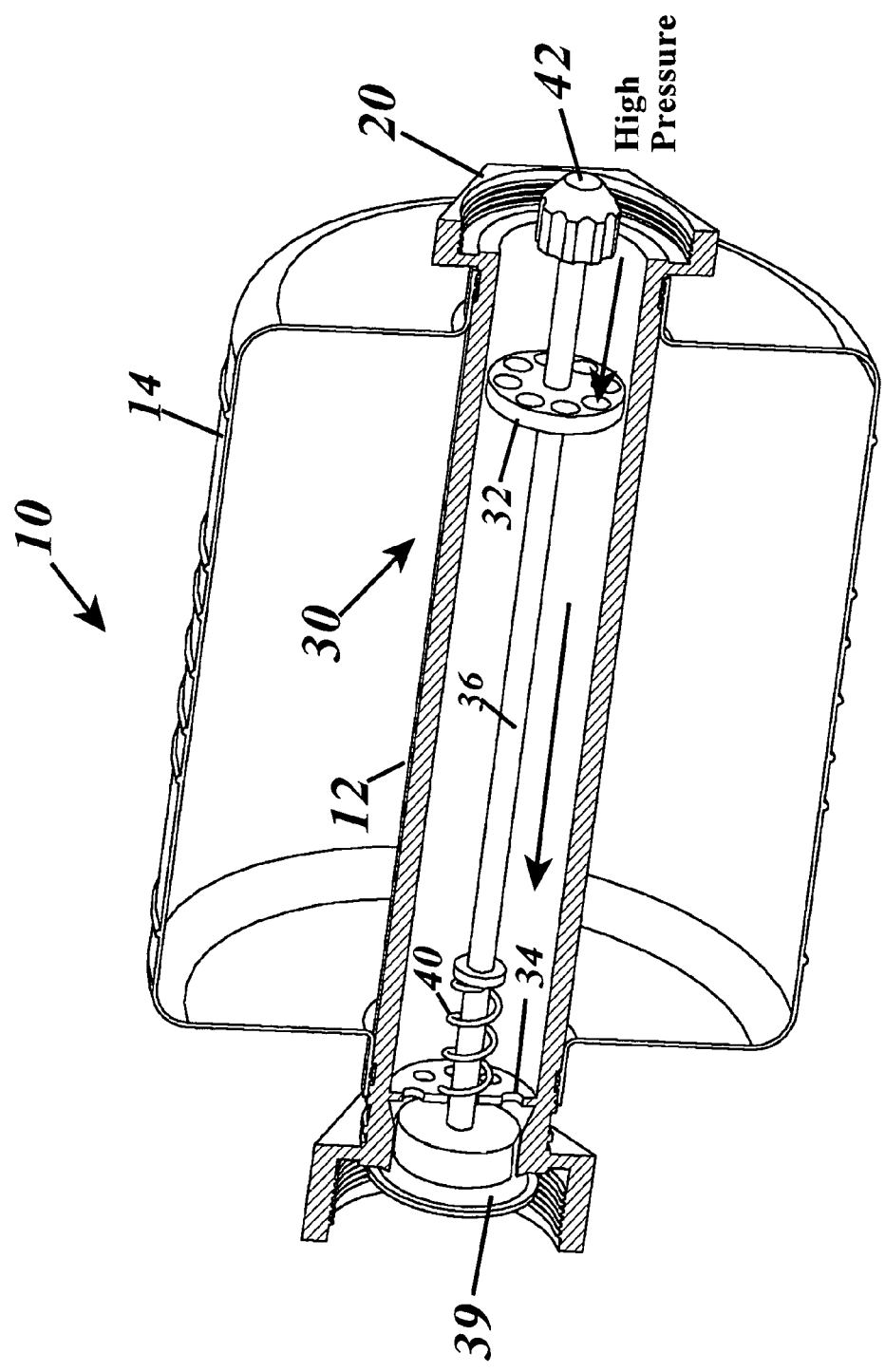
Figure 7:
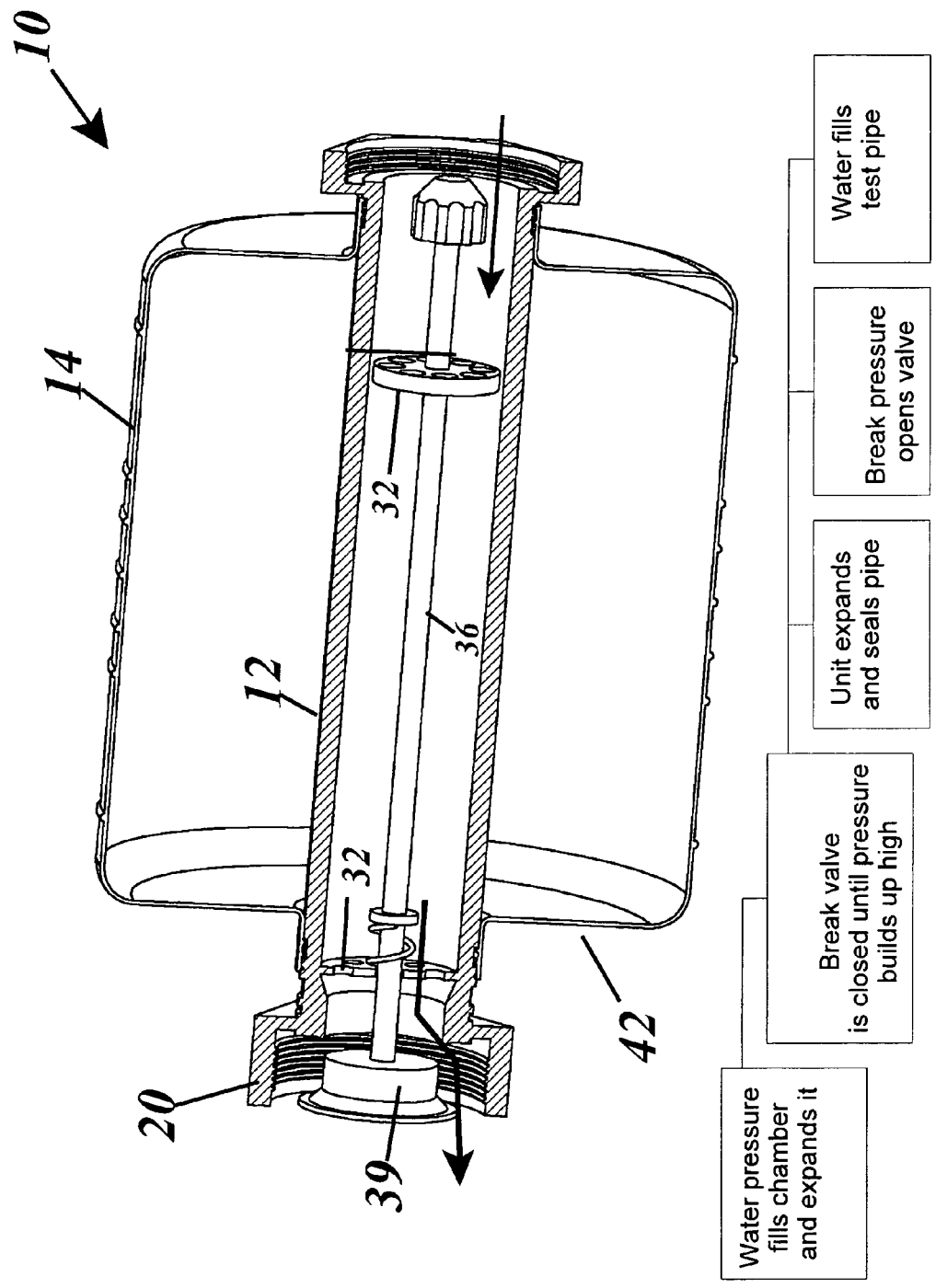
FIG. 7 is a sectional view depicting fluid flow and a descriptive flow chart.

Pipe plug apparatus 10 further includes a rigid cylindrical conduit 12, axially disposed relative to body 14. Rigid cylindrical conduit 12 includes an inlet 20 and an outlet 22. Inlet 20 is preferably threaded and outlet 22 may be threaded as best depicted in FIG. 5. Inlet 20 provides a connection port for connection of a hose 23 in fluid communication with a pressurized fluid source, such as a source of pressurized water, for pressurizing the pipe downstream of the plug. More particularly, once the apparatus is inserted into a vertical section of pipe and a seal is formed by radial expansion of body 14, water may be injected above the apparatus thereby pressurizing the pipe to allow for leak testing.

Conduit 12 further includes a spring biased valve assembly, generally referenced as 30, disposed therein. Valve assembly 30 functions as a back flow prevention device or check valve to allow water under sufficient pressure to flow into the pipe downstream of the plug via conduit inlet 20 and outlet 22, while preventing backflow. More particularly, valve assembly 30 includes first and second mounting plates, referenced as 32 and 34 respectively, and an elongate rod 36 received within axial apertures on the mounting plates so as to be axially disposed in slidable engagement with mounting plates 32 and 34. Each mounting plate 32 and 34 defines an axial aperture for receiving rod 36 and a plurality of radially spaced apertures 38 to allow for fluid flow past each plate. Rod 36 further includes a valve body 39 sized and shaped for seated sealing engagement with conduit end 22. As best depicted in FIG. 5, the valve assembly 30 is biased to a closed position by a helical spring 40 disposed in surrounding relation with rod 36 between a stop 42 connected to the rod and plate 34. Helical spring 40 thus biases the valve assembly 30 to a closed configuration wherein valve body 39 is sealingly seated within outlet 22 thereby preventing backflow. In addition, when hose 23 is connected to inlet 20 and pressurized water flows into conduit 12, through plate apertures 38, the pressure acting on valve body 39 causes valve assembly 30 to open by unseating the valve body from its sealed configuration thereby allowing water to flow through the apparatus into the pipe system. When the user turns the water supply off, spring 40 causes valve body 39 to retract to the seated position thereby closing valve assembly 30 and maintaining the pressure within the downstream pipe system by preventing backflow. The valve assembly may be manually opened by the user by pushing on knob 42 on rod 36 thereby unseating valve body 39 and effectively opening the valve.

Figure 8:
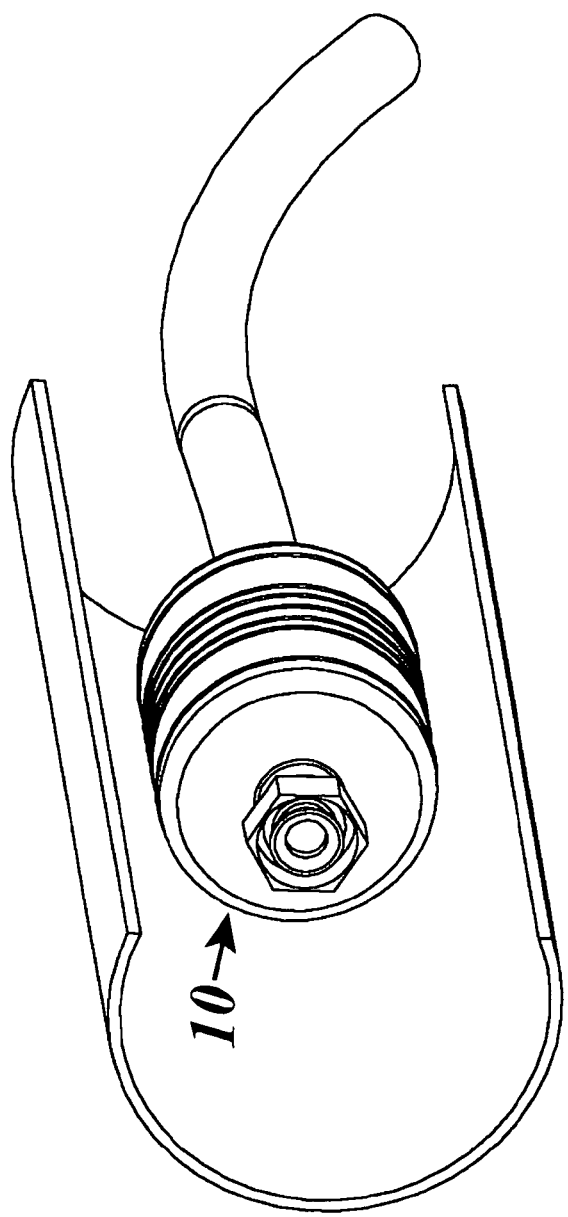
FIGS. 8–10 illustrate the plumbing pipe plug apparatus inserted within a section of pipe.
Figure 9:
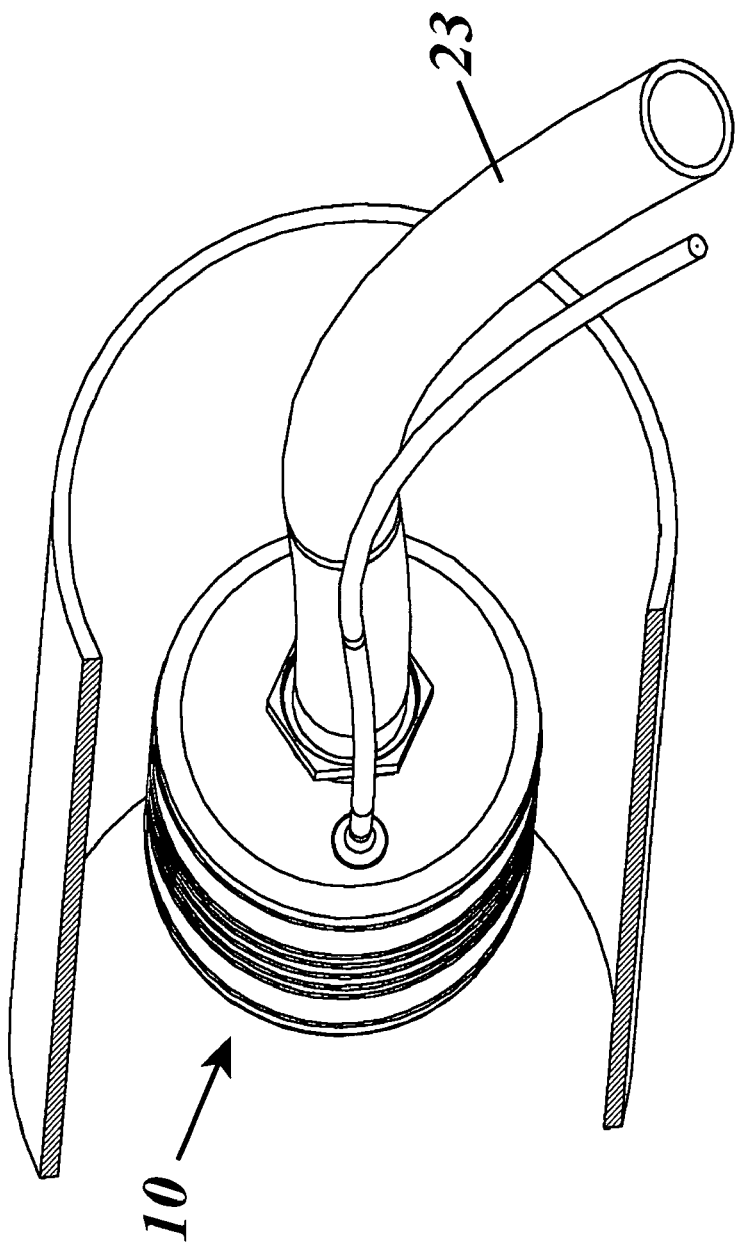
Figure 10:
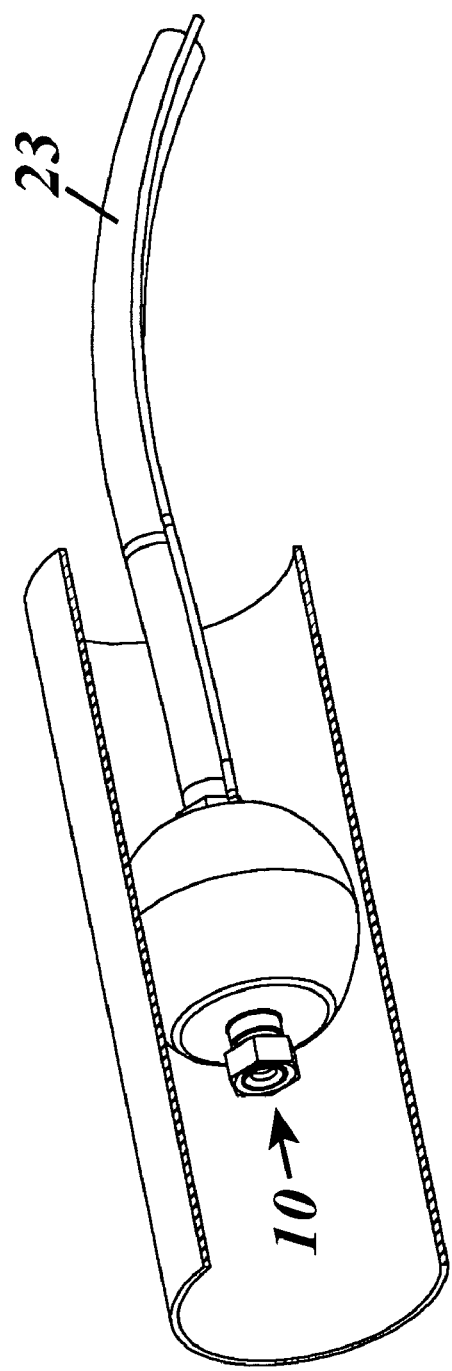

As best illustrated in FIGS. 8–10, leak testing apparatus 10 is employed by first inserting apparatus 10 into a section of pipe and inflating expandable body 14 by connection of a compressed air hose to schrader valve 16 thereby causing body 14 to radially expand until sealing engagement is achieved with the inner surface of the surrounding pipe. A water hose 23 is then threadably connected to conduit end 20 and water flow is initiated. Water flows through conduit 12 and plate apertures 38 until reaching valve body 39 wherein the water pressure acts on the valve assembly by overcoming the biasing force thereby forcing valve body 39 from its seated configuration to a longitudinally spaced open configuration whereby water is allowed to flow out of outlet 22 into the pipe system. Once sufficient water is introduced though apparatus 10 into the pipe system to adequately pressurize the system water flow is terminated and spring 40 retracts valve body 39 to the seated position thereby closing the valve and maintaining pressure on the pipe system downstream of apparatus 10. After leak testing is completed water may be drained from the pipe system by pushing knob 42 projecting from inlet end 20 so as to unseat valve body 39 thereby opening the valve and allowing water to flow from the pipe system in reverse flow via outlet 22 conduit 12 and inlet 20. Finally, the user bleeds air from expandable body 14 using Schrader valve 16 thereby contracting body 14 such that the apparatus may be removed from the pipe section.

The instant invention has been shown and described herein in what is considered to be the most practical and preferred embodiment. It is recognized, however, that departures may be made therefrom within the scope of the invention and that obvious modifications will occur to a person skilled in the art.

What we claim is:

1. A pneumatic pipe plug apparatus comprising:
    an expandable body having first and second ends, said second end having an inlet valve for connection to a compressed gas source, said body capable of radial expansion upon introduction of a compressed gas;
    a conduit axially disposed relative to said expandable body, said conduit having an inlet disposed proximal said body second end and an outlet disposed proximal said body first end;
    said conduit including a valve movable from a closed position to an open position; and
    a spring configured for biasing said valve to said closed position, said valve adapted to open in response to fluid pressure applied to said conduit inlet;
    said valve further including a manual actuator projecting from said conduit for opening said valve upon manual actuation thereof.

2. A pneumatic pipe plug apparatus according to claim 1, wherein said expandable body inlet valve is a schrader valve.

3. A pneumatic pipe plug apparatus comprising:
    an expandable body having first and second ends, said second end having a compressed gas valve for connection to a hose in fluid communication with a compressed gas source, said body capable of radial expansion upon introduction of a compressed gas through said compressed gas valve;
    a conduit axially disposed relative to said expandable body, said conduit having an inlet disposed proximal said body second end and an outlet disposed proximal said body first end;
    said conduit inlet having a female threaded connector;
    said conduit including a valve biased to a closed position by a spring, said valve adapted to automatically open in response to fluid pressure applied to said conduit inlet thereby allowing fluid to flow through said conduit from said inlet and out said outlet.

4. A pneumatic pipe plug apparatus according to claim 3, wherein said conduit valve further includes manual means for opening said valve.

5. A pneumatic pipe plug apparatus according to claim 4, wherein said manual means for opening said valve includes a push rod having a first end connected to an openable valve body and a second end projecting from said expandable body second end, whereby manually pushing on said rod second end opens said valve.

* * * * *